United States Patent
Katsuda et al.

(10) Patent No.: US 6,569,519 B2
(45) Date of Patent: May 27, 2003

(54) α-ALUMINA POWDER AND HEAT-CONDUCTIVE SHEET CONTAINING THE SAME

(75) Inventors: Toshifumi Katsuda, Niihama (JP); Hiroshi Takahashi, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 130 days.

(21) Appl. No.: 09/861,645

(22) Filed: May 22, 2001

(65) Prior Publication Data

US 2002/0022127 A1 Feb. 21, 2002

(30) Foreign Application Priority Data

May 23, 2000 (JP) ........................................ 2000-151108

(51) Int. Cl.⁷ ................................................ B32B 5/16

(52) U.S. Cl. ........................ 428/329; 428/323; 428/332; 428/402; 423/111; 423/122; 423/625

(58) Field of Search ................................ 423/133, 625; 117/950; 428/402, 323, 329, 332, 111, 122

(56) References Cited

U.S. PATENT DOCUMENTS

| 5,538,709 A | 7/1996 | Mohri et al. | 423/625 |
| 5,935,550 A | 8/1999 | Mohri et al. | 423/625 |
| 6,106,800 A | 8/2000 | Mohri et al. | 423/625 |
| 6,159,441 A | 12/2000 | Mohri et al. | 423/625 |
| 6,165,437 A | 12/2000 | Mohri et al. | 423/625 |

*Primary Examiner*—Paul Thibodeau
*Assistant Examiner*—Christopher Paulraj

(57) ABSTRACT

The present invention provides an α-alumina powder, which is suitable for use as a filler for silicon rubber or the like for manufacturing a heat-conductive sheet. The α-alumina powder includes α-alumina particles having an average particle diameter of not less than about 2 μm and not more than about 5 μm, a particle size distribution such that a ratio of 90 wt % diameter $D_{90}$ to 10 wt % diameter $D_{10}$ represented by $D_{90}/D_{10}$ is not more than about 2, and a crystalline form represented by an index A of more than about 0.40 and not more than about 0.50, wherein the index A is obtained by substituting X-ray intensities I(110), I(300) and I(116) at (110) plane, (300) plane and (116) plane, respectively, determined by X-ray diffraction, into the following formula (I):

$$A=\{I(110)+I(300)\}/\{2\times I(116)\} \qquad (I).$$

10 Claims, 3 Drawing Sheets

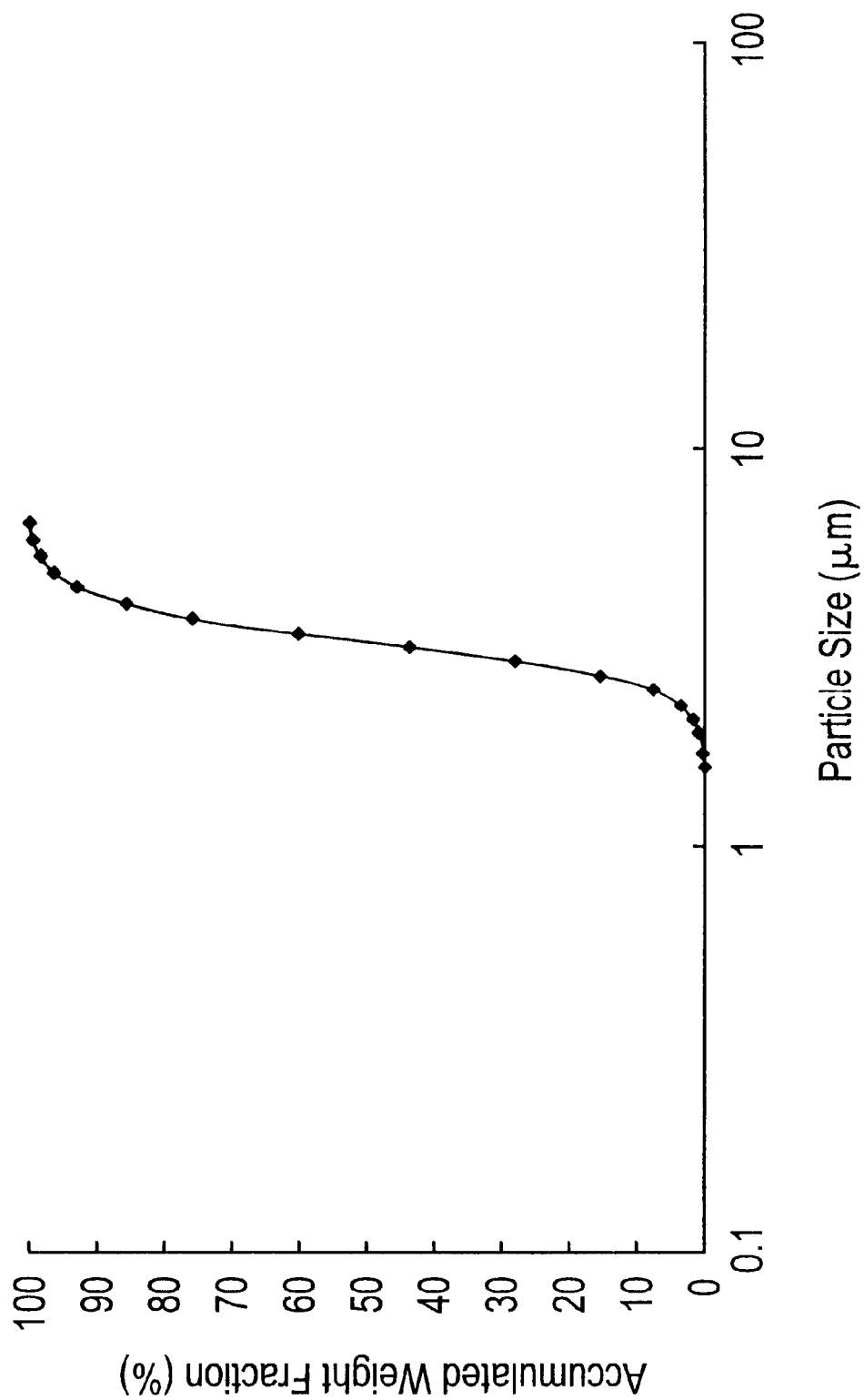

α-ALUMINA POWDER AND HEAT-CONDUCTIVE SHEET CONTAINING THE SAME

BACKGROUND OF THE INVENTION

1. Field of the Invention

The present invention relates to an α-alumina powder and a heat-conductive sheet containing the same and, more specifically, to an α-alumina powder suitable for use as a filler manufacturing a heat-conductive sheet.

2. Description of the Related Art

A semiconductor chip generates heat when it operates. Such heat must be radiated from the semiconductor chip to stabilize the operation of the chip. Usually, such a semiconductor chip is encapsulated with an epoxy resin or the like and used in the form of a package. To date, studies have been made to improve the heat conductivity of such an epoxy resin used as a packaging material in pursuit of effective radiation of heat generated from such a semiconductor chip. For instance, filling the epoxy resin with a heat-conductive inorganic powder been proposed as a method of improving the heat conductivity of the epoxy resin.

As the processing speed of semiconductor chips increases with improvements in chip design and manufacturing techniques, the amount of heat generated from such a semiconductor chip increases. Semiconductor chip packages, generally, are provided with a radiating plate composed of a metal to allow heat from the package to efficiently radiate to the outside. Further, such semiconductor packages are sometimes provided with a silicone rubber sheet located between the package and the radiating plate in order to provide a tight contact between the package and the radiating plate. In an attempt to improve the heat conductivity of such a sheet, including an α-alumina powder filler into the silicone rubber has been studied recently.

α-alumina powder, which is produced in a large quantity by, for example, a process of calcining aluminum hydroxide obtained by hydrolysis of an alkali aluminate, is inexpensive and easily available. For this reason, such an aluminum powder is widely used as a material for an abrasive or as a sintering material.

α-alumina powder having a narrow particle size distribution is known from, for example, Japanese Patent Laid-Open No. HEI 6-191833. Using conventional α-alumina powders, as they are, as fillers for silicone rubber sheets, however, is not easy because of difficulty in filling a large amount of such an α-alumina powder into the silicone rubber.

Accordingly, it is an object of the present invention to provide an α-alumina powder suitable for use as a filler for resin or a rubber (hereinafter referred to as "resin or the like") and a heat-conductive sheet containing the same.

SUMMARY OF THE INVENTION

The inventors of the present invention have studied α-alumina powders in order to improve their ability to be used as a filler for resin or the like and, as a result, discovered that a novel α-alumina powder having a crystalline form as described herein has a good filling property with respect to the resin or the like, and completed the present invention.

According to one aspect of the present invention, there is provided an α-alumina powder including α-alumina particles having an average diameter of not less than about 2 μm and not more than about 5 μm, a particle size distribution such that a ratio of 90 wt % diameter $D_{90}$ to 10 wt % diameter $D_{10}$ represented by $D_{90}/D_{10}$ is not more than about 2, and a crystalline form represented by an index A of more than about 0.40 and not more than about 0.50, wherein the index A is obtained by substituting X-ray intensities I(110), I(300) and I(116) at the (110) plane, the (300) plane and the (116) plane, respectively, determined by X-ray diffraction, into the following formula (I):

$$A = \{I(110) + I(300)\}/\{2 \times I(116)\} \qquad (I).$$

According to another aspect of the present invention, there is provided a heat-conductive sheet comprising a formed product made from a composition prepared by filling an α-alumina powder described above into resin or a rubber.

The foregoing and other objects, features and attendant advantages of the present invention will be better understood by reference to the following detailed description taken in conjunction with the accompanying drawings.

BRIEF DESCRIPTION OF THE DRAWINGS

FIG. 3 is a graphic representation of a particle size distribution of the α-alumina powder obtained in Example 1 of the present invention.

DETAILED DESCRIPTION OF THE PREFERRED EMBODIMENTS

Figure 1:
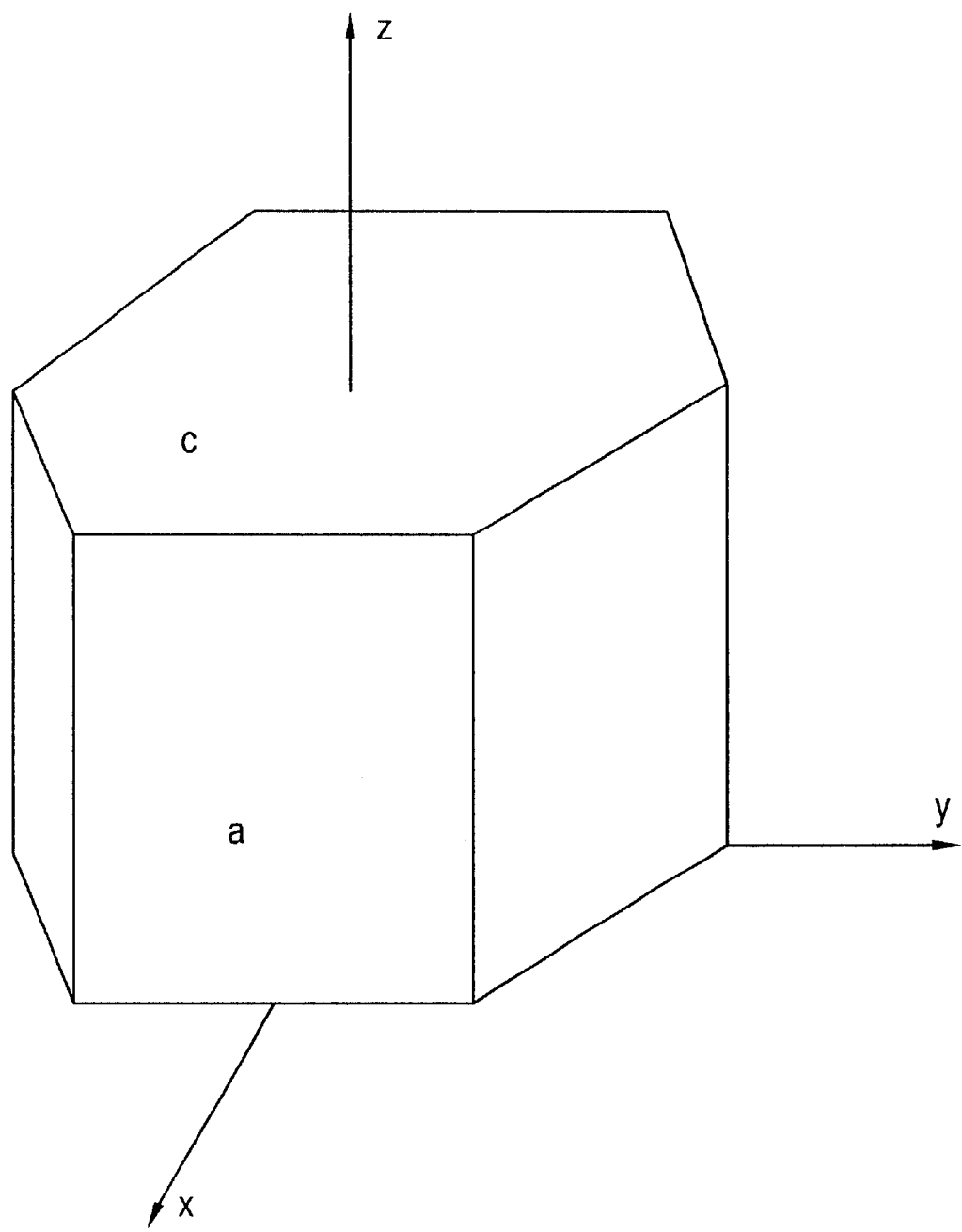
FIG. 1 is a schematic perspective view showing a crystalline form of an α-alumina powder according to the present invention.

The present invention will now be described in detail with reference to the attached drawings.

α-alumina is known to have a composition represented by $Al_2O_3$ and have a trigonal system as its crystal system. In the present invention, α-alumina having a crystalline form as described herein has been discovered. Specifically, an α-alumina powder according to the present invention has an index A within the range of from more than about 0.40 to not more than about 0.50, where the index A is obtained by substituting X-ray intensities at the (110) plane, the (300) plane and the (116) plane, all determined by X-ray diffraction, into the above formula (I). FIG. 1 schematically illustrates the crystalline form of the α-alumina powder. The (110) plane and the (300) plane are shown as plane a, and the (116) plane is shown as plane c.

Figure 2:
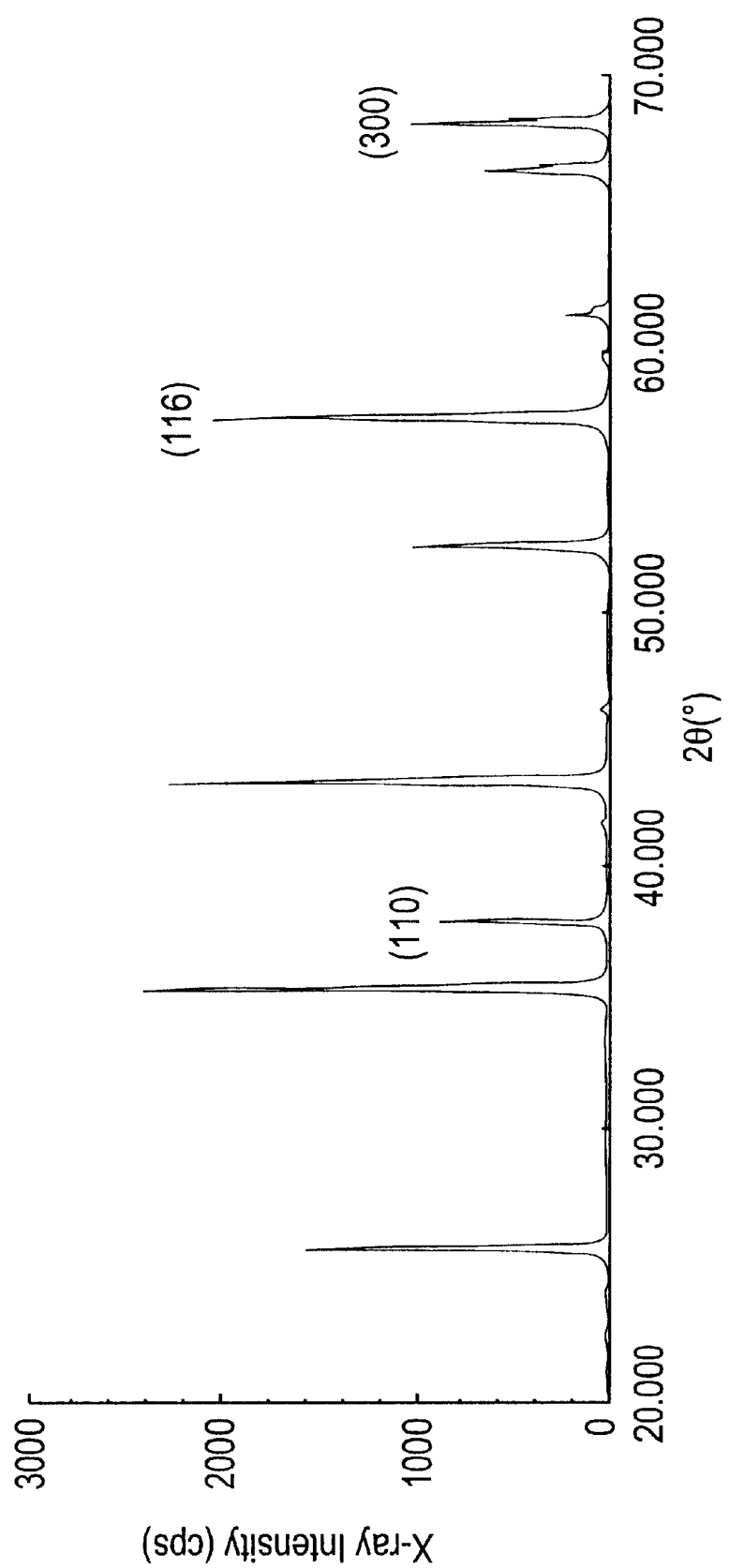
FIG. 2 is a diffraction spectrum of the α-alumina powder obtained in Example 1 of the present invention.

Generally, when the X-ray intensity I(116) at the (116) plane is low, a large index A result a, and the crystalline form of the α-alumina powder is isotropic, such as globular or cubic. When the index A is still larger, the crystalline form becomes rod-shaped. On the other hand, when the X-ray intensity I(116) at the (116) plane is high, a small index A results, and the crystalline form of the α-alumina powder becomes plate-shaped. FIG. 2 shows the X-ray diffraction spectrum of the α-alumina obtained in Example 1 of the present invention.

The α-alumina powder of the present invention is further defined by the average diameter of the powder and the ratio of 90 wt % diameter $D_{90}$ to 10 wt % diameter $D_{10}$ represented by $D_{90}/D_{10}$. As used herein, the term "90 wt % diameter" is determined by measuring the particle size distribution, and is indicative of the particle diameter whereby a corresponding accumulated weight fraction is 90% in a particle size distribution curve representing the relationship between particle size and corresponding accumulated particle weight fraction, the accumulation of which being with regard to particles having smaller diameters. Similarly, as used herein, the term "10 wt % diameter" is indicative of the particle diameter whereby a corresponding accumulated weight fraction is 10% in a particle size distribution curve. Thus, the α-alumina powder in accordance with the present invention has a particle size distribution such that the ratio of the particle size at the accumulated weight fraction of 90% ($D_{90}$) to the particle size at the accumulated weight fraction of 10% ($D_{10}$) represented by $D_{90}/D_{10}$ is not more than about 2. In this regard, FIG. 3 shows the particle size distribution curve of the α-alumina obtained in Example 1 of the present invention.

In the present invention, the average particle diameter of the α-alumina powder is not less than about 2 μm and not more than about 5 μm, preferably not more than about 4 μm, and the ratio of 90 wt % diameter $D_{90}$ to 10 wt % diameter $D_{10}$ represented by $D_{90}/D_{10}$ is not more than about 2.0, preferably not more than about 1.8. If the average particle diameter of the α-alumina powder is less than about 2 μm, the powder may agglomerate or the viscosity of a composition obtained by filling the α-alumina powder into the resin or the like may be undesirably increased. On the other hand, if the average particle diameter of the α-alumina powder is more than about 5 μm, the α-alumina powder may exhibit a large abrasive action and hence may abrade an extrusion machine or a like used for forming the resin or the like containing the α-alumina powder as a filler. If the $D_{90}/D_{10}$ ratio becomes more than about 2.0, that is, the particle size distribution becomes wide, coarse particles and fine particles included in the α-alumina powder become large in quantity. If coarse particles become large in quantity, such an α-alumina powder may not be preferable as a filler because strength of the resin thus obtained may become lower. If fine particles become large in quantity, fluidity of the α-alumina powder is lowered. Accordingly, such an α-alumina powder may also not be preferable as a filler because it may be difficult to uniformly fill such an α-alumina powder into the resin.

The α-alumina powder having the physical properties described above according to the present invention is distinguishable from conventional α-alumina powder produced in a large quantity by a process of calcining aluminum hydroxide obtained by hydrolysis of an alkali aluminate at least for the reason that the conventional α-alumina powder has a $D_{90}/D_{10}$ ratio outside the scope of the present invention (i.e., significantly more than 2) and a wider particle size distribution. The α-alumina powder disclosed in, for example, Japanese Patent Laid-Open Gazette No. HEI 6-191833 has a narrow particle size distribution like the α-alumina powder of the present invention, but has index A of significantly more than 0.50, which is determined based on the X-ray intensity, and hence is different from the α-alumina powder of the present invention in crystalline form.

It is preferable that the α-alumina powder of the present invention contains fluorine. Any suitable amount of fluorine atoms maybe used in the α-alumina powder of the present invention. Preferably, the amount of fluorine atoms is not less than about 20 ppm and not more than about 500 ppm. When the α-alumina powder having a fluorine atom content within that range is filled into the resin or the like, the resulting composition can have a decreased viscosity. It seems that the surface of each particle of the α-alumina powder in contact with the resin or the like is modified by adsorption of fluorine atoms to the particle surface and this modification influences the viscosity of the composition.

The α-alumina powder of the present invention can be prepared by any suitable process. For example, one process that may be used to prepare α-alumina powder of the present invention includes the following steps.

Aluminum hydroxide having a sodium atom content of not more than 0.05 wt % in terms of $Na_2O$ content may be obtained by hydrolysis of, for example, aqueous sodium aluminate. The aluminum hydroxide may be admixed with a fluorine atom-containing substance serving as a crystallization accelerator (which is sometimes called "mineralizer") in an amount of not less than about 500 ppm in terms of fluorine atom amount. The temperature of the resulting mixture may then be raised from normal room temperature at a rate of about 100° C./h or higher. The mixture may then be allowed to stand at 1200° C. or higher under flowing air for about 30 minutes or longer to calcine the same.

Alternatively, the α-alumina powder may be prepared by the following process. An aluminum hydroxide may be obtained by hydrolysis of aqueous sodium aluminate and then admixed the aluminum hydroxide with silica serving as a dealkalizing agent and a fluorine atom-containing substance serving as a crystallization accelerator in an amount of not less than about 500 ppm in terms of fluorine atom amount. The temperature of the resulting mixture may then be raised from normal room temperature at a rate of about 100° C./h or higher, and the mixture may be allowed to stand at about 1200° C. or higher under flowing air for about 30 minutes or longer to calcine the same. Of course, other suitable methods for preparing the α-alumina particles of the present invention will be apparent to one skilled in the art.

Examples of fluorine atom-containing substances that may be used in the present invention to provide fluorine atoms in the α-alumina powder, if desired, include aluminum fluoride, ammonium fluoride, sodium fluoride, and hydrogen fluoride. Among them, ammonium fluoride is preferred. Of course, fluorine atom-containing substances other than those identified above may be used in the present invention, as would be appreciated by one skilled in the art. The above processes make it possible to prepare the α-alumina powder without the necessity of a particle size adjustment of the calcined α-alumina powder, such as classification or mixing.

The α-alumina powder of the present invention can be used as a filler or resin or the like in arelatively large quantity. For example, it is possible to prepare a silicone rubber composition blended with the α-alumina powder in a high proportion and thus to improve the heat conductivity of the silicone rubber composition. An increase of 10% by weight in the amount of the α-alumina powder used as the filler to, for instance, 400 PHR, provides an increase of about 8% in the heat conductivity of the composition, although the actual heat conductivity increase will depend upon the kind of a resin used and the amount of the powder filed. (The abbreviation "PHR" represents parts by weight of filler or fillers per 100 parts by weight of a resin.

The heat-conductive sheet of the present invention can be obtained by any suitable method. For example, the sheet may be obtained by filling the α-alumina powder of the present invention into the resin or the like by a typical compounding process and forming the resulting compound into a sheet by extrusion or the like process. Other suitable methods for manufacturing the heat-conductive sheet of the present invention will be apparent to one skill in the art.

Similarly, the α-alumina powder of the present invention may be as a filler for any suitable resin. Examples of resin that may be used in the present invention include rubbers such as silicone rubber, thermoplastic resins such as polyethylene, polypropylene, polyvinyl chloride, and methacrylic resin, and thermosetting resins such as epoxy resin, unsaturated polyester resin, phenolic resin, and silicone resin. Other suitable resins for use in the present invention will be apparent to one skilled in the art. Preferably, the resin is silicone rubber or silicone resin.

The α-alumina powder of the present invention exhibits a low DOP(dioctyl phthalate) oil absorption and hence can be used as a filler in a large amount for the resin or rubber. In particular, the DOP oil absorption of the α-alumina powder of the present invention is not more than about 25.0 ml/100 g, preferably not more than about 24.5 ml/100 g. The DOP oil absorption (ml/100 g) represents the amount (ml) of dioctyl phthalate oil absorbed into 100 g of the α-alumina powder.

A heat-conductive sheet formed from a composition prepared by filling a large amount of the α-alumina powder of the present invention into silicone rubber or the like has the advantage of efficiently radiating heat from a semiconductor chip package to the outside when it is located between the package and a radiating plate.

EXAMPLES

The present invention will be more specifically described by way of examples.

The measurement of the physical properties and the evaluation of the α-alumina powder obtained in each example were carried out as follows.

1. X-ray diffraction

The X-ray diffraction spectrum of each sample was measured using an X-ray diffractometer (manufactured under the trade-name "RAD-IIA" by Rigaku Industrial Corp.) under the following conditions:

target=Cu target,
voltage=40 kV, current=20 mA,
slit=DS1°-SS1°-RSO.30 mm,
scan speed=2.00°/min,
scan step=0.020°/step X-ray intensities I(110), I(300) and I(116) at locations where 2θ assumed 37.7°, 68.2°, and 57.5°, respectively, were determined from the X-ray diffraction spectrum. These X-ray intensities thus determined were substituted into the above-mentioned formula (I) to calculate index A.

2. Average particle diameter, 90 wt % diameter $D_{90}$, and 10 wt % diameter $D_{10}$ ($\mu$m)

To each sample was added 0.2% sodium hexametaphosphate solution and the resulting mixture was subjected to irradiation by ultrasonic wave for 300 sec using a 40 W ultrasonic wave generator to disperse the sample. Thereafter, the particle size distribution of the sample was measured using a particle size distribution analyzer (manufactured under the trade-name "MICROTRUCK HRA" by REED AND NORTHLAP CO.).

3. Filling property of α-alumina powder with respect to resin

The filling property of each sample with respect to the resin or the like was evaluated by measuring the DOP oil absorption (ml/100 g) of the α-alumina powder. The DOP oil absorption (ml/100 g) was measured by a method according to JIS-K6221.

This method can be used in evaluating the filling property as taught by KOGYO ZAIRYO, Vol.39, No. 1, p.116-117 (1991). As the DOP oil absorption decreases, the filling property with respect to the resin or the like becomes better and, hence, the α-alumina powder can be used as a filler in an increasing amount can be filled in the resin or the like per unit weight. The amount of the powder which can be used as a filler in the resin or the like increases by about 3% to 5% as the DOP oil absorption decreases by 1 ml/100 g, although the actual increase in powder level will depend upon the kind of the resin and amount of powder utilized.

This means that about a 4% improvement in heat conductivity of a heat-conductive sheet can be realized by using an α-alumina powder exhibiting 1 ml/100 g lower DOP oil absorption.

Example 1

100 parts by weight of aluminum hydroxide having an average particle diameter of 3 $\mu$m and a sodium content of 0.05 wt % in terms of $Na_2O$ content was mixed with 0.19 parts by weight of ammonium fluoride (produced in the highest quality rank by Wako Pure Chemical Industries, Ltd.). The resulting mixture was put into an alumina saggar, which in turn was introduced into a tunnel kiln where the temperature was raised at a rate of 130° C./h. The mixture in the saggar was allowed to stand in air at 1300° C. for two hours in the tunnel kiln to achieve calcination, followed by cooling to give an α-alumina powder. The physical properties and the results of evaluation of the α-alumina powder thus obtained are shown in Table 1.

Example 2

100 parts by weight of aluminum hydroxide having an average particle diameter of 3 $\mu$m and a sodium content of 0.3 wt % in terms of $Na_2O$ content was mixed with 0.29 parts by weight of ammonium fluoride (produced in the highest quality rank by Wako Pure chemical Industries, Ltd.) and 10 parts by weight of silica sand. The resulting mixture was calcined in the same manner as in Example 1 to give an α-alumina powder. The physical properties and the results of evaluation of the α-alumina powder thus obtained are shown in Table 1.

Comparative Example 1

100 parts by weight of aluminum hydroxide having an average particle diameter of 3 $\mu$m and a sodium content of 0.05 wt % in terms of $Na_2O$ content was mixed with 0.48 parts by weight of ammonium fluoride (produced in the highest quality rank by Wako Pure chemical Industries, Ltd.). The resulting mixture was calcined in the same manner as in Example 1 to give an α-alumina powder. The physical properties and the results of evaluation of the α-alumina powder thus obtained are shown in Table 1.

TABLE 1

|  | Average particle diameter ($\mu$m) | $D_{90}$ ($\mu$m) | $D_{10}$ ($\mu$m) | $D_{90}/D_{10}$ | Index A | Fluorine-atom content (ppm) | Dop oil absorption (ml/100 g) |
|---|---|---|---|---|---|---|---|
| Example 1 | 3.4 | 4.4 | 2.6 | 1.7 | 0.46 | 46 | 23.9 |
| Example 2 | 3.9 | 5.1 | 3.0 | 1.7 | 0.43 | 300 | 23.6 |
| Comparative Example 1 | 4.1 | 5.6 | 3.0 | 1.9 | 0.38 | 640 | 25.9 |

Example 3

415 parts by weight of the α-alumina powder obtained in Example 1 can be homogeneously compounded with 100 parts by weight of polypropylene. A sheet obtained by forming the resulting composition has an improved heat conductivity as compared with a sheet formed by using a conventional α-alumina powder.

Comparative Example 2

375 parts by weight of the α-alumina powder powder obtained in Comparative Example 1 can be homogeneously compounded with 100 parts by weight of polypropylene. However, when 415 parts by weight of this same α-alumina powder is compounded with 100 parts by weight of polypropylene as in Example 3, flocculation results undesirably.

Example 4

The α-alumina powder obtained in Example 1 is compounded in a large amount with silicone to give a silicone rubber composition and the resulting composition is formed into a silicone rubber sheet filled with the α-alumina powder using an extruding machine. This sheet has higher heat conductivity than a conventional sheet and hence is capable of radiating a larger amount of heat from a semiconductor chip package when this sheet is inserted between the package and a radiating plate.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An α-alumina powder, comprising α-alumina particles having an average diameter of not less than about 2 μm and not more than about 5 μm, a particle size distribution such that a ratio of 90 wt % diameter $D_{90}$ to 10 wt % diameter $D_{10}$ represented by $D_{90}/D_{10}$ is not more than about 2, and a crystalline form represented by an index A of more than about 0.40 and not more than about 0.50, wherein the index A is obtained by substituting X-ray intensities I(110), I(300) and I(116) at the (110) plane, the (300) plane and the (116) plane, respectively, determined by X-ray diffraction, into the following formula (I):

$$A = \{I(110) + I(300)\} / \{2 \times I(116)\} \quad (I).$$

2. The α-alumina powder according to claim 1, further comprising fluorine atoms in an amount of about 20 to about 500 ppm.

3. The α-alumina powder according to claim 1, wherein the average particle diameter is not less than about 2 μm and not more than about 4 μm.

4. The α-alumina powder according to claim 1, wherein the ratio of 90 wt % diameter $D_{90}$ to 10 wt % diameter $D_{10}$ represented by $D_{90}/D_{10}$ is not more than about 1.8 in the particle size distribution.

5. A heat-conductive sheet, comprising a formed product made from a composition prepared by filling an α-alumina powder into a resin or a rubber, wherein the α-alumina powder comprises α-alumina particles having an average diameter of not less than about 2 μm and not more than about 5 μm, a particle size distribution such that a ratio of 90 wt % diameter $D_{90}$ to 10 wt % diameter $D_{10}$ represented by $D_{90}/D_{10}$ is not more than about 2, and a crystalline form represented by an index A of more than about 0.40 and not more than about 0.50, wherein the index A is obtained by substituting X-ray intensities I(110), I(300) and I(116) at the (110) plane, the (300) plane and the (116) plane, respectively, determined by X-ray diffraction, into the following formula (I):

$$A = \{I(110) + I(300)\} / \{2 \times I(116)\} \quad (I).$$

6. The heat-conductive sheet according to claim 5, wherein the formed product is made from a composition prepared by filling the α-alumina powder into a rubber.

7. The heat-conductive sheet according to claim 6, wherein the rubber is a silicone rubber.

8. The heat-conductive sheet according to claim 5, wherein the formed product is made from a composition prepared by filling the α-alumina powder into a resin.

9. The heat-conductive sheet according to claim 8, wherein the resin is a silicone resin.

10. The heat-conductive sheet according to claim 8, wherein the resin is polypropylene.

* * * * *